United States Patent Office 3,687,739
Patented Aug. 29, 1972

3,687,739
COATED METAL AND METHOD
Alexander W. Kennedy, Chardon, and Irving Malkin, University Heights, Ohio, assignors to Diamond Shamrock Corporation, Cleveland, Ohio
No Drawing. Continuation-in-part of abandoned application Ser. No. 788,334, Dec. 31, 1968. This application Dec. 10, 1970, Ser. No. 96,970
Int. Cl. C23f 7/26
U.S. Cl. 148—6.2                                                                 20 Claims

ABSTRACT OF THE DISCLOSURE

A composite coating provides enhanced corrosion protection for metal substrates and can maintain substrate electroconductivity, e.g., for weldability. The undercoating on the surface of the substrate is a residue in intimate mixture with pulverulent metal, with the residue being obtained from curing an applied corrosion-resistant, hexavalent-chromium-containing liquid composition containing chromic acid. The coating over such residue results from curing an applied topcoat composition comprising an electrically conductive pigment in a vehicle.

CROSS REFERENCE TO RELATED APPLICATION

This application is a continuation-in-part of U.S. application Ser. No. 788,334, filed Dec. 31, 1968, now abandoned.

BACKGROUND OF THE INVENTION

Hexavalent-chromium-containing liquid compositions are often applied to metal surfaces as dilute chromic acid treatments to typically impart enhanced corrosion resistance to sometimes precoated and often heated metal surfaces. Such coatings have been shown for example, in U.S. Patents 3,210,850, 2,777,785, and 2,762,732. These rinsing and treating compositions may contain some trivalent chromium, or the compositions can form trivalent chromium compounds during application and/or curing. Without more, i.e., without some underlying metal surface coating such as taught in U.S. Patent 2,777,785, the resulting treated metal surfaces can display initial, very limited corrosion resistance, but under vigorous conditions, such as extended exposure to moist, salty air, such protection is of undesirably short duration.

The coating of weldable metal substrates with so-called "welding primers" containing electrically conductive pigments offers coating protection for such substrates prior to subsequent welding operation. Otherwise it has generally been necessary to coat substrates susceptible to welding operations only after the completion of such welding. Additionally, these primers containing pigments such as finely-divided carbon or magnetite, or a particulate metal, e.g., zinc, copper, cadmium, or aluminum and which primers have high pigment concentrations, for example, up to about 96 weight percent of pigment, can provide some corrosion protection for the substrate metal. Therefore, such primers may be employed on metal substrates where no subsequent welding operation is contemplated. But, under conditions such as continued exposure to moist, salty air these primers may offer corrosion resistance of an only limited duration.

SUMMARY OF THE INVENTION

It has now been found that when uncoated surfaces of metal substrates are treated with hexavalent-chromium-containing liquid compositions containing chromic acid, and the resulting treated surface that can result therefrom is topcoated with an applied and cured welding primer, such ensuing surface has excellent, augmented corrosion resistance of unexpected superiority in view of the expected protection to be obtained by the additive effects of the individual treatment and coating themselves.

Additionally, because of this enhanced protection under corrosive conditions, thin coating films may now be employed without sacrifice in corrosion protection. These thin films are highly desirable, for example, during metal stamping. Thin films result in retarded die buildup, and those reduce to eliminate deleterious film removal during stamping. Moreover, the invention can maintain substrate electroconductivity, e.g., for weldability or deposition of electrocoat paint. Further, after application to weldable substrates, extended electrical resistance welding free from film pick-up on the electrodes, for example, up to 2,000 production spot welds between electrode cleaning may be achieved.

Broadly, the present invention is directed to a metal substrate having at the surface thereof an adherent, corrosion-resistant coating which comprises: (1) an undercoating comprising not substantially above about 5,000 milligrams per square foot of coated substrate of pulverulent metal selected from the group consisting of zinc, aluminum, manganese, magnesium, mixtures thereof and alloys of same in intimate mixture with residue obtained by applying to such surface a hexavalent-chromium-containing liquid composition for metal substrates containing hexavalent-chromium-providing material supplied by at least about 80 weight percent chromic acid, in liquid medium, the liquid composition providing the residue with not above about 500 milligrams per square foot of coated substrate of chromium, and heating such substrate at a temperature, and for a period of time, sufficient to vaporize volatile substituents from the liquid composition and deposit on the surface such residue, with the coating containing a weight ratio of chormium to pulverulent metal not substantially above about 0.5:1; and (2) a topcoating from an applied topcoating composition comprising a particulate, electrically conductive pigment in a vehicle, wherein such electrically conductive pigment is selected from the group consisting of aluminum, copper, cadmium, magnetite, carbon, and zinc.

Additionally, the present invention relates to preparing a metal substrate exhibiting the above-described adherent, corrosion-resistant coating. It is further directed to welded and electrocoated articles and to their production.

The metal substrates contemplated by the present invention are exemplified by the metal substrate to which a chromic acid/t-butanol, chromic acid/water coating may or can be applied for enhancing corrosion resistance of such substrate metals. For example, such metal substrates may be aluminum and its alloys, zinc and its alloys, copper and cupriferous, e.g., brass and bronze. Additionally, exemplary metal substrates include cadmium, titanium, nickel, and its alloys, tin, lead, chromium, magnesium and alloys thereof, and for weldability, preferably a ferrous metal substrate such as iron, stainless steel, or steel such as cold rolled steel or hot rolled and pickled steel. All of these for convenience are usually referred to herein simply as the "substrate."

For convenience, the hexavalent-chromium-containing liquid compositions are often referred to herein as "treating compositions" and the "residue" on a metal surface is such resulting surface condition obtained after application of such composition to, and typically heating resulting applied composition on, a metal substrate.

DESCRIPTION OF THE PREFERRED EMBODIMENTS

The corrosion-resistant, hexavalent-chromium-containing liquid composition contains chromic acid as the hexavalent-chromium-providing substance or its equivalent, for example, chromium trioxide or chromic acid anhydride. But a minor amount, e.g., 20 percent or less, of such chromium can be supplied by a salt such as ammonium dichromate, or by sodium or potassium salts, or by substances such as calcium, barium, magnesium, zinc, cadmium, and strontium dichromate. Additionally, a minor amount such as 20 percent or less of the hexavalent-chromium-providing substance might be a mixed chromium compound, i.e., include trivalent chromium compounds. Although the liquid composition might contain as little as about 0.25 weight percent of hexavalent chromium, expressed as $CrO_3$, and may contain as much as about 500 grams per liter of composition of hexavalent chromium, expressed as $CrO_3$, such composition typically contains from about 1 up to about 10 weight percent of hexavalent chromium, expressed as $CrO_3$.

For supplying the liquid medium, although the water and t-butanol are miscible in all proportions, where t-butanol supplies the preponderant amount of the liquid medium, preferably only a very minor amount of the medium is water or water plus other liquid material to enhance corrosion resistance of final coated substrates. Thus, liquid mediums which are preponderantly t-butanol advantageously contain less than about 10 percent and preferably are virtually to completely water free. For economy, where water supplies the preponderant amount of the liquid medium, the balance of the medium advantageously contains less than about 25 percent of other liquids such as t-butanol, or hydrocarbons, and preferably, for enhanced economy, these liquids are present in an amount of less than about 15 percent by volume, or may be completely absent.

The liquid medium may also be preponderantly an inert organic liquid or blend of liquids, i.e., not readily oxidized in solution by chromic acid. Organic liquids have been discussed, for example, in U.S. Pats. 2,762,732 and 3,437,531. Tertiary alcohols are present in such blends in typically at least twice the amount, on a molar basis, as the amount of chromic acid, to insure solution of such acid. Suitable inert liquids that have been, and may be, used include hydrocarbons such as benzene and pyridine and halogenated hydrocarbons such as trichlorethylene and carbon tetrachloride.

In some instances, for enhanced corrosion protection of the substrate, the metals for the pulverulent metal are the less noble metals, i.e., magnesium, aluminum, manganese, and zinc, as well as their alloys, e.g., zinciferous and alumini-ferous metals, and additionally include mixtures of any such metals. Preferably, for efficiency and economy, such metal is zinc, or aluminum, or their mixtures.

The pulverulent metal can be flake, or powder, or both but should have particle size such that all particles pass 100 mesh and a major amount pass 325 mesh ("mesh" as used herein is U.S. Standard Sieve Series). Advantageously, for preparing a coated substrate having augmented uniformity in the distribution of the pulverulent metal, as well as enhanced bonding of metal to the substrate, the pulverulent metal employed is one wherein essentially all particles, e.g., 80 weight percent or more, pass 325 mesh.

When the pulverulent metal is present in the coating composition, the composition should be made up with an amount of such metal sufficient to supply not substantially above about 1,000 grams of metal per liter of coating composition liquid medium. The presence of greater than about 1,000 grams per liter of pulverulent metal is undesirable, for example, can add expense without a significant increase in corrosion protection for the coated substrate. Preferably, for economy and desirable coating characteristic, the composition contains between about 50–500 grams of metal per liter.

Also, for such pulverulent metal containing coating compositions, the chromium, expressed as $CrO_3$, should not exceed more than about 200 grams per liter of composition medium. Greater than about 200 grams per liter of chromium is uneconomical and can deleteriously detract from the characteristics of the coated metal surface, for example, the most desirable corrosion resistance for the coated metal substrate. Further, such composition should have a weight ratio of chromium, expressed as $CrO_3$, to pulverulent metal of at least about 0.08:1.

A ratio of less than about 0.08:1 may not provide sufficient chromium in the coating to achieve augmented bonding of the pulverulent metal to the metal substrate. A ratio of as great as about 2:1 may be achieved, but should be at metal concentrations of less than about 100 grams per liter. As the metal content approaches about 1,000 grams per liter and thus the chromium content can approach about 200 grams per liter the upper weight ratio of chromium, expressed as $CrO_3$, to pulverulent metal approaches 0.2:1. It has been found that the very concentrated coating compositions containing between about 500–1,000 grams per liter of pulverulent metal have particular utility in the coating of small parts as opposed to application to large substrate areas such as metal coils. Typically, the compositions containing pulverulent metal have above about 30 grams per liter of liquid medium of chromium, expressed as $CrO_3$, and below about 100 grams per liter of chromium.

The coating ingredients may be combined into separate packages, e.g., one containing the hexavalent-chromium-providing substance in a liquid medium, and the other package being a dispersion in liquid medium of pulverulent metal, each package additionally containing some surface active agent. Such separate packages may be blended together before application to the metal substrate or may be separately or simultaneously applied.

The pulverulent metal can be applied dry to the metal substrate, for example by simply brushing or blasting the metal onto the substrate, or by electrostatic spraying. When applied separately, it can be applied dry or applied as a dispersion in volatile liquid, for example, water or readily volatile alcohol, or other volatile organic liquids such as benzene, with water being preferred for economy. For economy, such dispersions advantageously contain at least about 5 grams per liter of dispersed metal, to avoid subsequent uneconomical evaporation of large amounts of volatile liquid, and may contain above 90 weight percent of pulverulent metal in the case of a dense metal such as zinc, i.e., above 65 volume percent of such metal.

Such dispersions and liquid compositions, i.e., the hexavalent-chromium-containing liquid composition additionally containing, or free from, pulverulent metal, may be applied to the metal substrate by any conventional method for coating a substrate with a liquid, for example, dip coating, roller coating or reverse roller coating, curtain coating, airless spray, rotary brush coating, pressure spray, or combinations of such techniques as, for example, spray and brush techniques. However, for usual spray application, the amount of pulverulent metal in a dispersion for a dense metal such as zinc, does not exceed about 500 grams per liter. Typically the hexavalent-chromium-containing liquid composition is applied to a metal surface by simply dipping the metal article into the composition.

Where the pulveruent metal is applied as a separate dispersion such dispersion may be applied even after the application of the liquid composition, so long as such composition has not been cured. The metal surface can be a preheated metal surface to assist in the curing of the composition, or such liquid composition or dispersion may be applied to the metal surface after an etch, e.g., a nitric acid etch, or may be applied from a heated bath, for example, one heated up to 200° F. The metal-containing coating composition or the separate dispersion can contain up to, for example, about 5 weight percent of a surface active agent, and these can include dispersion agents, suspending agents, defoaming agents, and wetting agents, referred to herein for convenience simply as surface active agents.

They may be present in as little as 0.001 weight percent.

Such agent may typically be a hydroxyl-containing hydrocarbon ether which includes the alkyl ethers of alkylene glycols, such as butyl ether of propylene glycol, the oxyalkyl ethers of alkylene glycols, e.g., 1-butoxyethoxy-2-propanol, fatty alcohol, polyoxyalkylethers, alkylphenol polyoxyalkylethers such as polyoxyethylated nonylphenols, and polyalkylene glycols, e.g., tetraethylene glycol. Other suitable surface active agents which may be used include products prepared from waste sulfite liquors such as lignin sulfonic acids and products from pine wood distillation, e.g., pine oil.

The resulting coating weights on the metal substrate may vary to a considerable degree but, exclusive of the pulverulent metal, the residue will most typically always be present in an amount supplying above about 5 milligrams per square foot of chromium, expressed as chromium and not $CrO_3$. If the coated metal substrate is to be subsequently formed, the residue should contain not substantially above about 150 milligrams per square foot of chromium as the coating may be subjected to cracking or crazing during forming operation, although when subsequent forming is not contemplated, and extended corrosion resistance may be desirable, such residue may contain up to about 500 milligrams per square foot of chromium.

With the regard to the amount of pulverulent metal that is present on the surface of the substrate in the coating residue, such residues may typical contain as little as about 10–20 milligrams or less per square foot of pulverulent metal. However, residues can contain substantially more pulverulent metal. e.g., 600–700 milligrams per square foot of such metal, and the substrate may contain up to about 5,000 milligrams per square foot of pulverulent metal, whereas an excess of that amount is usually uneconomical.

It can be appreciated that the present invention is directed to coatings wherein there is an excess of pulverulent metal to chromium, even at the lesser concentrations of the metal. Generally, the coating should have a weight ratio of chromium, expressed as chromium and not $CrO_3$, to pulverulent metal of less than about 0.5:1, and, such ratio is most usually for the less heavy coating weights, since as the coating weights approach, for example, 5,000 milligrams per square foot of pulverulent metal, the weight ratio of chromium to pulverulent metal will be less than about 0.2:1. It has also been found that for coil coating, the weight ratio of chromium, expressed as chromium and not $CrO_3$, to pulverulent metal will preferably be in the range of between about 0.5:1–0.04.1, for economy and efficiency, with the weight for the metal in the coating residue being typically below about 2,000 milligrams per square foot of coated substrate. For coating small parts, i.e., parts smaller than coils, which can be final products that will not be normally subjected to subsequent forming, and where coating weights may approach 5,000 milligrams per square foot of pulverulent metal, the weight ratio of chromium to pulverulent metal in the coating may be as low as about 0.02:1.

Other compounds may be present in the hexavalen-chromium-containing liquid composition, but, even in combination, are present in very minor amounts so as not to deleteriously affect the coating integrity, e.g., with respect to weldability and galvanic protection. Thus, such compositions should contain 0–40 grams per liter of resin, i.e., are substantially resin-free, and contain 0–40 grams per liter of pigment. Since the adherence for the particulate metal to the metal substrate is achieved by the chromium-providing-substance, such coating compositions are preferably resin-free.

These other compounds further include inorganic salts and acids as well as organic substances, often typically employed in the metal coating art for imparting some corrosion resistance or enhancement in corrosion resistance for metal surfaces. Such materials include acids of phosphorous such as phosphoric acid, zinc chloride, magnesium chloride, various chromates, e.g., strontium chromate, molybdates, glutamic acid, fluoridic acid, succinic acid, zinc nitrate, succinimide, and polyacrylic acid and these are most usually employed in the liquid composition in amount totaling less than about 15 grams per liter.

For the metal substrates containing applied liquid composition and pulverulent metal, and which will be topcoated by a weldable primer that is not baked but rather cured by drying as will be more particularly discussed hereinbelow, these are heated before topcoating. Otherwise, they are usually dried without heating and thereby establish a dried residue that is then topcoated with a weldable primer, and the total coating heated for curing the undercoating and the topcoating. When the undercoating is cured before application of weldable primer, the preferred temperature for the heating, also often referred to as baking, and that may be preceded by drying such as air drying, is within the range from about 375° F. but more typically from about 425° F. at a pressure of 760 mm. Hg up to above above 900° F. Such an elevated substrate temperature may be attained by preheating the metal prior to application of the liquid composition. However, such curing temperatures do not often exceed a temperature within the range of about 450°–550° F. At the elevated curing temperatures the heating can be carried out in as rapidly as about 0.2 second or less but is often conducted for several minutes at a reduced temperature.

Before starting the treatment of the present invention it is, in most cases advisable to remove foreign matter from the metal surface by thoroughly cleaning and de-greasing. De-greasing may be accomplished with known agents, for instance, with agents containing sodium metasilicate, caustic soda, carbon tetrachloride, trichlorethylene, and the like. The use of a commercial alkaline cleaning composition which combines washing and mild abrasive treatments can be employed for cleaning, e.g., an aqueous trisodium phosphate-sodium hydroxide cleaning solution. In addition to cleaning, the substrate can undergo cleaning plus etching, for example, with a hydrofluoric acid etching agent.

The undercoating residue is topcoated with a "weldable primer" containing an electrically conductive pigment in a vehicle. More particularly, the welding primers are coating compositions containing a particulate, electrically conductive pigment of aluminum, coper, cadmium, steel, carbon, zinc, or magnetite, i.e., the magnetic oxide of iron, and including mixtures thereof such as of aluminum flake and zinc powder. Generally, the carbon pigments, e.g., channel blacks or furnace blacks, are the most finely divided of these electrically conductive pigments, often having particle size of 0.01 micron for the intensely black pigments. Comparatively, the finely divided aluminum powders have flake thicknesses for the finest grades of about 0.25 micron. These aluminum pigments can be typically produced by stamping, generally of small pieces of aluminum foil, or by ball milling atomized aluminum formed by air blasting a molten aluminum spray. Typically a finely divided zinc pigment is a distilled zinc dust or particles prepared by atomizing molten zinc in an air stream. Particle size for distilled zinc powders often average from about 2 to about 6 microns with generally about 99 weight percent or better passing a 240 mesh U.S. Standard Sieve.

Since these primers generally are applied preparatory to subsequent welding of the substrate, they must contain a substantial amount of the electrically conductive pigment, e.g., at least about 30 volume percent pigment for the zinc-rich primers and often more than about 65 percent by volume of particulate pigment, but on a weight basis, because of the density of the zinc, these primers can contain up to about 98 weight percent of such pigment.

In formulating the weldable primers, the binder component can be made up of resins specially selected to afford particular characteristics to the applied coating. Thus the binder components for the zinc-rich primer having the greatest adhesion are polyamide resins combined with epoxy resins, although other binder materials have been found to be compatible with particulate zinc pigment, e.g., polystyrene, chlorinated or isomerized rubber, polyvinyl acetate and polyvinyl chloride-polyvinyl acetate copolymers, alkyd/melamine, and epoxy esters including epoxy ester medium oil content linseed oil. Additionally the formulations can contain flow control agents, as for example urea formaldehyde resins, thixotroping agents such as silica and organic derivatives of magnesium montmorillonite, and anti-settling agents particularly for the aluminum and zinc primers which agents include hydrogenated castor oil and aluminum stearate. Also for the aluminum and zinc primers where gassing can be a problem a gas inhibiting substance such as lime or calcium oxide is generally included in the formulation. Also, these primers usually contain, and/or are typically cut back after formulation but before application with, petroleum derived hydrocarbon liquids such as toluene, benzene, xylene, and synthetically prepared aromatic solvent blends from petroleum. Zinc-rich weldable primers have been more extensively reviewed in an article entitled "Zinc-Rich Paints" in Paint and Varnish Production, April 1964, p. 35 f.; May 1964, p. 87 f.; and June 1964, p. 47 f.

The final makeup of the primer can be dependent upon the method of application of the primer to the treated metal substrate. Typically for primers containing zinc dust or combinations of zinc dust with aluminum flake, or zinc flake with aluminum flake and the like, where such primers are spray applied to the metal substrate they may contain between about 50-80 weight percent of the pulverulent metal and between about 10-30 weight percent of binder. Also such primers generally are formulated with a few weight percent or less of a thixotroping agent, and often with a half weight percent or less of a metallic drier, e.g., a lead, manganese, cobalt or other metallic salt of organic acid, and typically 10-30 weight percent of petroleum derived hydrocarbon liquid.

However, for such primers which are electrically deposited, they typically contain, based on the weight of the total paint solids, 40-65 weight percent of electrically conductive pigment, e.g., zinc flake or combinations of zinc and aluminum flake, as well as 20-40 weight percent binder plus 5-25 weight percent of one or more extender pigments. However, on a basis of the overall coating bath, such electrodeposited primers can typically contain greater than about 80 weight percent of water medium supplied by deionized water to avoid any reactions between the electrically conductive pigment and water. Additionally, in the overall coating bath, there is usually present in very minor amounts, e.g., a half percent or less, a pigment dispersing agent, such as a metallic stearate, a comparable amount of surfactant, as well as slightly greater amounts of organic solvent, supplied for example by a petroleum distillate.

For those electrically deposited primers, the extender pigment, e.g., rutile or anatase titanium dioxide, zinc oxide, leaded zinc oxide or the like, is included to enhance the uniformity of the deposited primer film. Also, the binders used for such electrodeposited primers are preferably high resistance type resins, thereby permitting the presence of enhanced amounts of extender pigment in the primer formulation. For electrodeposition, such primers are typically coated onto copper, cupriferous, zinciferous, or ferrous metal substrates.

The primer can also be applied to the treated substrate by other various methods, e.g., any of the methods which may be used for application of the hexavalent-chromium-containing liquid composition to the substrate, and which have been mentioned hereinabove. Generally to achieve a significant enhancement in augmenting corrosion resistance, the applied primer has a film thickness in excess of about 0.05 mil, but for economy, has a film thickness not substantially in excess of about 6 mils. For electroconductivity, especially for weldability, the primer is present in a thickness not substantially in excess of about 2 mils, and preferably for economy plus electroconductivity is present in a thickness of about 1 mil or less. It will usually provide a major amount, e.g., 60 percent or more of the total coating thickness. The primer is preferably applied to a treated substrate which has first been cooled to a temperature below about 200° F. after curing of the applied liquid composition, since substrate temperatures above about 200° F. may cause excessively rapid evaporation of the volatile components in the primer composition which can result in a discontinuous, applied film.

After application the primer is cured, which can often be accomplished simply by air drying at room temperature or by accelerated air drying at an elevated temperature such as 200° F. or higher. Additionally, such drying can be enhanced by catalytic action, for example with a metallic drier including lead, manganese, and cobalt or other metallic salts of organic acids, e.g., cobalt acetate. Such primers as are cured at room temperature by air drying can be ostensibly dry to the touch in as quickly as 10-12 minutes. Many of the weldable primers, e.g., those based on epoxy resin or epoxy/melamine resins for the binder component, are cured at an elevated temperature and for a period of time sufficient to vaporize volatile composition substituents, with the baking temperature being dependent upon the applied film thickness as well as on the particular binder present in the formulation.

For baking, a simple convection oven is preferred as opposed to infrared baking, since the capacity of the zinc and aluminum primers to reflect infrared radiation can lead to inefficient operation. Advantageously, for primers cured at elevated temperatures, they are baked at a temperature within the range of between about 350-1000° F. for a time of about 0.1-10 minutes. Temperatures below about 350° F. and times of less than about 0.1 minute can provide incomplete baking which, especially on mill finished coils, may lead to deleterious film removal, e.g., during coiling. Temperatures above about 1000° F. can lead to film degradation, e.g., charring of the binder solids, and baking times of greater than about 10 minutes are usually uneconomical. Typically, a zinc-rich primer having an applied film thickness of between about 0.1-3 mils is baked in an oven having an ambient air temperature of about 400°-700° F. and for a time of about 0.3-5 minutes.

The liquid composition residue which is further topcoated with a weldable primer may also form a particularly suitable substrate for paint deposition by electrocoating. This application may be used with metal substrates as well as other substrates, e.g., polysulfones and other synthetic polymer surfaces, which can withstand curing of the applied coating composition, typically at a temperature as low as about 300° F. or less for compositions in a t-butyl alcohol medium, or a more elevated temperature cure of 350°-400° F., or more, for compositions in aqueous medium.

The electrodeposition of film-forming materials is well known and can include electrocoating of simply a film-forming material in a bath or such a bath which may contain one or more pigments, metallic particles, drying oils, dyes, extenders, and the like, and the bath may be a dispersion or ostensible solution and the like. Some of the well known resinous materials useful as film-forming materials include the polyester resins, alkyd resins, acrylate resins, hydrocarbon resins, and epoxy resins, and such materials can be reacted with other organic monomers and/or polymers including hydrocarbons such as ethylene glycol, monohydric alcohols, ethers, and ketones.

Of particular interest are polycarboxylic acid resins which can be solubilized with polyfunctional amino compounds and include the siccative oil-modified polybasic acids, esters or anhydrides which can be further reacted with divinyl benzene for example or acrylic acid and esters as well as polymerizable vinyl monomers. Such mention of suitable baths for electrodeposition is made herein by way of example and should not be construed as limiting. More exhaustive discussions of such film-forming systems have been set forth, for example, in U.S. Patents 3,304,250 and 3,455,805.

Also, substances of particular interest, for example in the automotive industry, are the anodically deposited film-forming materials which have gained considerable acceptance in this field and are exemplified by U.S. Patent 3,230,162. However, the broad scope to which the electrodeposition of film-forming materials relates, includes the deposition of such materials on anodic or cathodic substrates, and by means of various techniques for passage of current through a bath, including even intermittent pulsed current. After electrodeposition and removal of the coated substrate from the bath, curing of the film-forming materials is performed. The time and temperature of curing will be dependent upon the film-forming materials present, but is typically an air cure at room temperature or a forced cure at a temperature up to 500° F. and for times up to 60 minutes, at more reduced temperatures.

After coating by any of the methods of the present invention, the resulting coated substrate can be further topcoated with any suitable paint, i.e., a paint, primer, enamel, varnish, or lacquer. Such paints may contain pigment in a binder or can be unpigmented, e.g., generally cellulose lacquers, rosin varnishes, and oleoresinous varnishes, as for example tung oil varnish. The paints can be solvent reduced or they may be water reduced, e.g., latex or water-soluble resins, including modified or soluble alkyds, or the paints can have reactive solvents such as in the polyesters or polyurethanes. Additional suitable paints which can be used include oil paints, including phenolic resin paints, solvent-reduced alkyds, epoxys, acrylics, vinyl, including polyvinyl butyral and oil-wax-type coatings such as linseed oil-paraffin wax paints. The paints may be applied as mill finishes.

When reference is made herein to the application of a thin film of weldable primer prior to welding of the substrate, it is to be understood that the subsequent welding under consideration can be spot welding, i.e., localized electrical resistance welding, or seam welding such as with roller electrodes. Typically spot welding may be performed with copper electrodes at electrode loads from about 100 to about 5,000 pounds, and at 4–5 volts and about 10,000–17,000 amps operating conditions, with a weld time, in cycles, from about 4 to about 400 based on a 60 cycle frequency. When the weldable substrate is susceptible to coating on more than one surface, e.g., a sheet or strip of ferruginous material, the undercoat composition can be applied and cured on all surfaces, and the topcoat composition may be applied only to those surfaces which will be in close proximity or direct contact with the welding electrodes.

The following examples show ways in which the invention has been practiced but should not be construed as limiting the invention. In the examples the following procedures have been employed.

PREPARATION OF TEST PANELS

Steel test panels (4" x 12", and all being cold rolled, low carbon steel panels) are cleaned by dipping into water, or by spraying with water, which has incorporated therein 2–5 ounces of cleaning powder per gallon of water. The cleaning powder is 25% by weight of tetrasodium pyrophosphate, 25% by weight of disodium phosphate, and the balance sodium hydroxide, or such cleaning powder is 25 weight percent tripotassium phosphate and 75 weight percent potassium hydroxide. The bath is maintained at a temperature of about 150°–180° F. After this cleaning, the panels can be scrubbed with a brush or a dry cleaning pad which is a porous, fibrous pad of synthetic fiber impregnated with abrasive. Following the cleaning, or cleaning plus scrubbing, the panes are rinsed with warm water.

CORROSION RESISTANCE TEST
(ASTM B–117–64)

Corrosion resistance of coated panels is measured by means of the standard salt spray (fog) test for paints and varnishes, ASTM B–117–64. In this test, the test panels are placed in a chamber kept at constant temperatures where they are exposed to a fine spray (fog) of a 5% salt solution for specified periods of time, rinsed in water and dried. The extent of corrosion and film removal on the test panels are then compared one with the other by visual inspection.

Example 1

Ten panels are prepared as described above for testing. Six panels are dipped into a t-butanol bath containing 35 grams per liter of $CrO_3$ and 200 grams per liter of powdered zinc metal having average particle size of 2.9 microns. After dipping, the six panels are removed from the bath, excess composition drained from the panels and they are then immediately cured in a circulating oven for a time of six minutes up to a substrate temperature of about 475° F.

Three of the resulting panels as well as three initial panels which have not received a pretreatment are coated with a zinc-rich primer based on an epoxy resin binder, having initially a weight per gallon of about 20 lbs., and a solids value of 50 percent. The primer is cut back before use to a viscosity of about 50 seconds as measured on a No. 4 Ford cup with the aromatic solvent described in Example 2. The six primer coated panels are cured by placing for 4 minutes in an air circulating oven and thereby obtaining a substrate temperature up to 425° F. Primer coating thickness on the six panels measure 0.5 mil for each panel. All panels are then subjected to the salt spray corrosion resistance test as described hereinabove. The results of such testing are shown in the table below.

TABLE

| Panel | Pretreatment | Primer | Corrosion resistance in salt spray Coating failure | Test hours to failure |
|---|---|---|---|---|
| 1 | No | No | Red rust | >1 |
| 2 | Yes | No | do | 310 |
| 3 | Yes | No | do | 310 |
| 4 | Yes | No | do | 320 |
| 5 | No | Yes | Blister | 1 65 |
| 6 | No | Yes | do | 1 80 |
| 7 | No | Yes | do | 1 80 |
| 8 | Yes | Yes | Red rust | 445 |
| 9 | Yes | Yes | do | 480 |
| 10 | Yes | Yes | do | 480 |

1 All red rust by 110–120 hours but blistering so badly before then that coating considered failed by 65, 80, and 80 hours, respectively.

The above results thus demonstrate the desirable enhanced corrosion protection for panels containing a pulverulent metal. Bare steel panels, that is, panel No. 1 in the above table, offer virtually no corrosion resistance in salt spray whatsoever. Panels receiving the pretreatment alone exhibit red rust failure in 310–320 hours while panels with the zinc-rich primer alone exhibit deleterious blistering failure in 65–80 hours. The additive test hours to failure for the panels with the pretreatment alone plus the panels with the primer alone is thus from merely 375 to 400 hours; this compares with the 445–480 continuous hours for the treated panels. Thus when comparing firstly these eariler failure figures, i.e., 375 hours for the additive panels vs. 445 hours for the combination panels, and then secondly the best results, i.e., 400 vs. 480 hours, it can be seen that the combination treatment can provide an excellent enhancement in corrosion resistance of as much as 20 percent or more.

Example 2

A test coil of cold rolled, low carbon steel is cleaned in a cleaning bath as described hereinabove and the cleaned steel is coated with a coating composition containing 30 g./l. of $CrO_3$ and 100 g./l. of the pulverulent zinc described in Example 1, in a t-butanol bath. The coil is coated by reverse roll coating the composition onto the coil with a rubber roll with the coil moving at 12 feet per minute. Thereafter the coated coil is cured at 475° F. After cooling the coil is coated as hereinabove described with a zinc-rich primer having at first a weight per gallon of 23.1 pounds, an initial solids volume of 50 percent, and containing initially 84.5 weight percent of non-volatiles. Prior to use, this primer is reduced to a viscosity of 45 seconds as measured on a No. 4 Ford cup with an aromatic solvent prepared synthetically from petroleum and having a flash point of 145°–150° F. The coil is cured at 425° F. and is thereafter cut into panels that exhibit a total coating thickness of about 0.5 mil.

Before application of the primer, analysis shows that the undercoated panels contain about 36 milligrams per square foot (mgms./ft.[2]) of chromium and about 150 mgms./ft.[2] of zinc. These panels are subjected to the most severe, extended electrical resistance spot welding, such as has found acceptance in the automotive industry. Such stringent, extended electrical resistance spot welding, as has been mentioned hereinabove, requires that the panels proceed through 2,000 spots with a minimum of misfiring, i.e., with a minimum of welding failures although the panel goes through the weld cycle. To pass the specification of the automobile industry, such a panel must additionally provide a button after 2,000 spots measuring at least 0.220 inch across. The results of such extended spot weld testing are as follows:

TABLE

| | |
|---|---|
| Undercoat chromium,[1] mgms./ft.[2] | 36 |
| Undercoat zinc, mgms./ft.[2] | 150 |
| Topcoat thickness, in mils | 0.5 |
| Elec. resis. spot welds: | |
| No. | 2,000 |
| Misfires | None |
| Button dia. at 2,000 | 0.240″ |

[1] Expressed as chromium and not $CrO_3$.

As is seen from the above table, the panels readily pass even this most severe electrical resistance spot welding test, pulling a good button, as well as being free from misfires.

Example 3

Test panels (B) and (D) are prepared as described above and are coated in the manner of Example 1, except that the bath for coating panel (D) is a t-butanol bath containing 20 g./l. of $CrO_3$ and 50 g./l. of the powdered zinc metal and the bath for panel (B) is a water bath containing 20 g./l. of $CrO_3$, 150 g./l. of a powdered zinc, having an average particle size of about 5 microns, and 1.5 g./l. of heteropolysaccharide dispersing agent. The panels are dried and then baked under infrared lamps at a substrate temperature reaching 450° F. The panel (D) contains about 19 mgms./ft.[2] of chromium and about 85 mgms./ft.[2] of zinc, and the panel (B) contains about 30 mgms./ft.[2] of chromium and about 250 mgms./ft.[2] of zinc.

The panel (D) as well as an additional panel (C) are coated with the zinc-rich primer of Example 2 by coating primer on the panel, removing excess primer composition therefrom, and curing the primer in the manner of Example 2. The thickness of the primer for all panels is 0.5 mil.

All panels (B), (C), and (D) as well as a clean steel panel (A) prepared as described above are all coated with a black-pigment electrocoat primer containing at first 40 percent of non-volatiles which before use is reduced with deionized water in a proportion of 1 part by volume paint to 3 parts by volume water. Panels are immersed in the electrocoat paint bath as anodes and paint is applied typically for 2 minutes at 90 volts. Following removal of the panels from the electrocoating bath, all panels are typically baked for 20 minutes at a temperature of 350°–425° F. After baking, all panels are scribed, the scribing is performed by cutting an X configuration on the face of the panel, the scribe lines being made through the coating to expose the underlying metal. The extent of corrosion along the scribe lines is made by visual inspection and through comparison among test panels.

All panels are subjected to the corrosion resistance test as described hereinbefore. In the table below the results of such corrosion resistance testing are shown. The results are presented as inches of failure of paint adhesion, to the nearest 1/32 of an inch, away from the scribe lines.

TABLE

| Panels | Undercoat | Primer thickness | Salt spray, 120 hours | |
|---|---|---|---|---|
| | | | Scribe | Face |
| A [1] | No | No primer | CLA | CLA |
| B | Yes | do | 12/32 | #4, L [2] |
| C | No | 0.50 mil | 2.5–3.5/32 | #8, F [2] |
| D | Yes | 0.5 mil | [3] 0/32 | O.K. |

[1] Electrocoated only.
[2] Number refers to blisters in accordance with ASTM D–714–56, and F=few, and L=light.
[3] 144 hours salt spray.

Note.—CLA = Complete loss of paint adhesion.

As can be seen from the above results, the electrocoat primer alone does not provide desirable paint adhesion. Also, the electrocoat primer over only the undercoat, or over only the zinc-rich primer, offers some corrosion resistance but this can be unacceptable, e.g., along the scribe lines in salt spray testing for the primer-electrocoat combination. However, electrocoated panels that first contain the undercoat and then the zinc-rich primer before electrocoating show excellent corrosion resistance. This is exhibited as a freedom from coating failure along scribe lines even after the more extended 144 hours of salt spray testing. Thus the combination of the undercoat with the weldable primer topcoat, affords an excellent substrate for subsequent deposition of electrocoat primer.

We claim:
1. A metal substrate having at the surface thereof an adherent, corrosion-resistant composite coating which comprises:
   (1) a substantially resin-free undercoating comprising not substantially above about 5,000 milligrams per square foot of coated substrate of pulverulent metal selected from the group consisting of zinc, aluminum, manganese, magnesium, mixtures thereof and alloys of same in intimate mixture with residue obtained by applying to said surface a hexavalent-chromium-containing liquid composition for metal substrates consisting essentially of, subject to the following proviso, hexavalent-chromium-providing material supplied by at least about 80 weight percent chromic acid, in liquid medium, said liquid composition providing said residue with not above about 500 milligrams per square foot of coated substrate of chromium, and heating said substrate at a temperature, and for a period of time, sufficient to vaporize volatile substituents from said liquid composition and deposit on said surface said residue, with said coating containing a weight ratio of chromium to pulverulent metal not substantially above about 0.5:1, and with the proviso that applied liquid composition containing pulverulent metal has above about 50 grams per liter of said metal; and (2) a topcoating from an applied topcoat composition comprising a particulate, electrically conductive pigment in a vehicle, wherein said electrically conductive pigment is selected from the group consisting of aluminum, copper, cadmium, magnetite, carbon and zinc.

2. The coated metal substrate of claim 1 wherein said undercoating is the residue remaining after heating applied composition containing not substantially in excess of about 500 grams per liter of hexavalent chromium, expressed as $CrO_3$, and said undercoating contains not substantially above about 2,000 milligrams per square foot of pulverulent metal applied to said substrate independently from the application of said liquid composition but before heating of said substrate.

3. The coated metal substrate of claim 1 wherein said topcoating has a film thickness between about 0.05–6 mils, said electrically conductive pigment is zinc, and said topcoat composition contains between about 30 and about 80 volume percent of said zinc pigment.

4. The coated metal substrate of claim 3 wherein said pulverulent metal is selected from the group consisting of zinc, aluminum, mixtures thereof, and alloys of same, and said residue is obtained from heating said substrate at a temperature not substantially in excess of about 900° F. and for a time of at least about 0.2 second.

5. The method of preparing a coated metal substrate having an adherent, corrosion-resistant composite coating at the surface of said substrate which method comprises:

(1) establishing on said surface a substantially resin-free hexavalent - chromium - containing composition residue from a liquid composition consisting essentially of, subject to the following proviso, a hexavalent chromium-providing material, supplied by at least about 80 weight percent chromic acid, and liquid medium, and in an amount sufficient to provide not above about 500 milligrams per square foot of coated substrate of chromium, with said composition residue on said surface being in intimate mixture with pulverulent metal selected from the group consisting of zinc, aluminum, manganese, magnesium, mixtures thereof, and alloys of same in sufficient amount to provide not substantially above about 5,000 milligrams per square foot of coated substrate of said pulverulent metal and to provide said coating with a weight ratio of chromium to pulverulent metal not essentially above about 0.5:1, with the proviso that applied liquid composition containing pulverulent metal has above about 50 grams per liter of said metal, thereby preparing a treated metal surface;

(2) applying over said treated metal surface a topcoat composition comprising a particulate, electrically conductive pigment in a vehicle, wherein said electrically conductive pigment is selected from the group consisting of aluminum, copper, cadmium, magnetite, carbon, and zinc; and (3) curing said topcoat composition.

6. The method of claim 5 wherein said substrate, after application of said liquid composition and pulverulent metal, is heated at a temperature not substantially above about 900° F. and for a time of at least about 0.2 second to establish said treated metal surface.

7. The method of claim 5 wherein said liquid composition is dried after application of same and said pulverulent metal to said surface, and the dried composition plus said topcoat composition, after application over said dried composition, are both cured by heating said substrate at a temperature not substantially in excess of about 1,000° F. and for a time of at least about 0.1 minute.

8. The method of preparing a weldable substrate for electrical resistance welding and having desirable corrosion resistance, which method comprises:

(1) establishing on said surface a substantially resin-free hexavalent-chromium-containing composition residue from a liquid composition consisting essentially of, subject to the following proviso, a hexavalent-chromium-providing material, supplied by at least about 80 weight percent chromic acid, and liquid medium, and in an amount sufficient to provide not above about 500 milligrams per square foot of coated substrate of chromium, with said composition residue on said surface being in intimate mixture with pulverulent metal selected from the group consisting of zinc, aluminum, manganese, magnesium, mixtures thereof, and alloys of same in sufficient amount to provide not substantially above about 5,000 milligrams per square foot of coated substrate of said pulverulent metal and to provide said coating with a weight ratio of chromium to pulverulent metal not essentially above about 0.5:1, with the proviso that applied liquid composition containing pulverulent metal has above about 50 grams per liter of said metal, thereby preparing a treated metal surface;

(2) establishing on the resulting treated metal surface a topcoat composition comprising a particulate, electrically conductive pigment in a vehicle, wherein said electrically conductive pigment is selected from the group consisting of aluminum, copper, cadmium, steel, magnetite, carbon, and zinc; and (3) curing said topcoat composition thereby preparing said substrate for welding with a coating providing corrosion resistance and weldable electroconductivity.

9. The method of claim 8 wherein said topcoat is at least in part established by applying a topcoat composition providing a cured film thickness not substantially above about 2.0 mils, said composition containing between about 30–80 volume percent of zinc pigment in admixture with a vehicle comprising a material selected from the group consisting of polystyrene, chlorinated rubber, isomerized rubber, polyvinyl acetate, epoxy resin, polyamide resin combined with epoxy resin, and polyvinyl chloride-polyvinyl acetate copolymers.

10. The method of claim 8 wherein said treated metal surface is at least in part established by heating said substrate containing liquid composition and pulverulent metal at a temperature not substantially above about 900° F. and for a time of at least about 0.2 second and said substrate after establishing said topcoat composition thereon is heated at a temperature not substantially in excess of about 1000° F. and for a time of at least about 0.1 minute.

11. A weldable metal substrate prepared for electrical resistance welding according to the method of claim 8.

12. The method of preparing a coated and welded metallic article, wherein the welding is electrical resistance welding which method comprises:

(1) establishing on said surface a substantially resin-free hexavalent-chromium-containing composition residue from a liquid composition consisting essentially of, subject to the following proviso, a hexavalent-chromium-providing material, supplied by at least about 80 weight percent chromic acid, and liquid medium, and in an amount sufficient to provide not above about 500 milligrams per square foot of coated substrate of chromium, with said composition residue on said surface being in intimate mixture with pulverulent metal selected from the group consisting of zinc, aluminum, manganese, magnesium, mixtures thereof, and alloys of same in sufficient amount to provide not substantially above about 5,000 milligrams per square foot of coated substrate of said pulverulent metal and to provide said coating with a weight ratio of chromium to pulverulent metal not essentially above about 0.5:1, with the proviso that applied liquid composition containing pulverulent metal has above about 50 grams per liter of said metal, thereby preparing a treated metal surface;

(2) establishing on the resulting treated metal surface a topcoat composition comprising a particulate, electrically conductive pigment in a vehicle, wherein said electrically conductive pigment is selected from the group consisting of aluminum, copper, cadmium, steel, magnetite, carbon, and zinc;

(3) curing said top coat composition thereby preparing said substrate for welding with a coating providing corrosion resistance and weldable electroconductivity;

(4) contacting at least a portion of said one article with another article of metal to be welded;

(5) passing an electrical resistance welding current through said articles of metal and said coating thereon at the zone selected for welding; and (6) fusing said articles together in said zone of said welding.

13. The method of claim 12 wherein said liquid composition is dried after application of same and said pulverulent metal to said surface, and the dried composition plus said topcoat composition, after application over said dried composition, are both cured by heating said substrate at a temperature not substantially in excess of about 1,000° F. and for a time of at least about 0.1 minute.

14. A welded article prepared according to the method of claim 12.

15. The method of preparing a substrate for receiving a deposition of electrocoat paint, which method comprises:

(1) establishing on said surface a substantially resin-free hexavalent-chromium-containing composition residue from a liquid composition consisting essentially of, subject to the following proviso, a hexavalent-chromium-providing material, supplied by at least about 80 weight percent chromic acid, and liquid medium, and in an amount sufficient to provide not above about 500 milligrams per square foot of coated substrate of chromium, with said composition residue on said surface being in intimate mixture with pulverulent metal selected from the group consisting of zinc, aluminum, manganese, magnesium, mixtures thereof, and alloys of same in sufficient amount to provide not substantially above about 5,000 milligrams per square foot of coated substrate of said pulverulent metal and to provide said coating with a weight ratio of chromium to pulverulent metal not essentially above about 0.5:1, with the proviso that applied liquid composition containing pulverulent metal has above about 50 grams per liter of said metal, thereby preparing a treated metal surface;

(2) establishing on said treated metal surface a topcoat composition comprising a particulate electrically conductive pigment in a vehicle, wherein said electrically conductive pigment is selected from the group consisting of zinc, aluminum, copper, cadmium, steel, magnetite, carbon, and mixtures thereof; and (3) curing said topcoat composition thereby preparing an electroconductive, coated substrate for receiving deposition of electrocoat paint thereon.

16. The method of preparing an article having a coating of electrocoat paint, wherein the substrate surface of the article is treated to receive the deposition of such paint, which method comprises:

(1) establishing on said surface a substantially resin-free hexavalent-chromium-containing composition residue from a liquid composition consisting essentially of, subject to the following proviso, a hexavalent-chromium-providing material, supplied by at least about 80 weight percent chromic acid, and liquid medium, and in an amount sufficient to provide not above about 500 milligrams per square foot of coated substrate of chromium, with said composition residue on said surface being in intimate mixture with pulverulent metal selected from the group consisting of zinc, aluminum, manganese, magnesium, mixtures thereof, and alloys of same in sufficient amount to provide not substantially above about 5,000 milligrams per square foot of coated substrate of said pulverulent metal and to provide said coating with a weight ratio of chromium to pulverulent metal not essentially above about 0.5:1, with the proviso that applied liquid composition containing pulverulent metal has above about 50 grams per liter of said metal, thereby preparing a treated metal surface;

(2) establishing on said treated metal surface a topcoat composition comprising a particulate electrically conductive pigment in a vehicle, wherein said electrically conductive pigment is selected from the group consisting of zinc, aluminum, copper, cadmium, steel, magnetite, carbon, and mixtures thereof;

(3) curing said topcoat composition thereby preparing an electroconductive, coated substrate for receiving deposition of electrocoat paint thereon;

(4) immersing into a bath of electrocoat paint containing an electrode the resulting treated surface and preparing same as an electrode;

(5) electrolyzing said bath of electrocoat paint; and (6) removing the resulting electrocoated article from said bath and curing the deposited electrocoat paint thereon.

17. The method of claim 16 wherein said liquid composition is dried after application of same to said surface, and the dried composition plus said top coat composition, after application over said dried composition, are both cured by heating said substrate at a temperature not substantially in excess of about 1,000° F. and for a time of at least about 0.1 minute.

18. An electrocated article prepared by the process of claim 16.

19. The method of preparing a corrosion resistant, welded metal assembly having an electrocoat painted surface, which method comprises:

(1) establishing on said surface a substantially resin-free hexavalent-chromium-containing composition residue from a liquid composition consisting essentially of, subject to the following proviso, a hexavalent-chromium-providing material, supplied by at least about 80 weight percent chromic acid, and liquid medium, and in an amount sufficient to provide not above about 500 milligrams per square foot of coated substrate of chromium, with said composition residue on said surface being in intimate mixture with pulverulent metal selected from the group consisting of zinc, aluminum, manganese, magnesium, mixtures thereof, and alloys of same in sufficient amount to provide not substantially above about 5,000 milligrams per square foot of coated substrate of said pulverulent metal and to provide said coating with a weight ratio of chromium to pulverulent metal not essentially above about 0.5:1, with the proviso that applied liquid composition containing pulverulent metal has above about 50 grams per liter of said metal, thereby preparing a treated metal surface;

(2) establishing on the resulting treated metal surface a topcoat composition comprising a particulate, electrically conductive pigment in a vehicle, wherein said electrically conductive pigment is selected from the group consisting of aluminum, copper, cadmium, steel, magnetite, carbon, and zinc;

(3) curing said topcoatd composition thereby preparing said substrate for welding with a coating providing corrosion resistance and weldable electroconductivity;

(4) contacting at least a portion of the article having the prepared substrate with another article of metal to be welded;

(5) passing an electrical resistance welding current through said articles of metal and said coating thereon at the zone selected for welding, and fusing said articles together at said zone of welding, thereby forming said welded metal assembly;

(6) immersing into a bath of electrocoat paint containing an electrode the resulting assembly and preparing same as an electrode; and (7) electrolyzing said bath of electrocoat paint.

20. A welded and electrocoated assembly prepared by the process of claim 19.

References Cited

UNITED STATES PATENTS

| 3,242,130 | 3/1966 | Jackopin | 117—75 X |
| 3,351,504 | 11/1967 | DeHart | 148—6.2 X |
| 3,318,716 | 5/1967 | Schuster et al. | 148—6.2 |
| 3,325,432 | 6/1967 | Kellert | 148—6.2 |
| 3,248,251 | 4/1966 | Allen | 148—6.16 X |
| 3,462,319 | 8/1969 | Campbell | 148—6.16 |
| 3,464,906 | 9/1969 | Ridley | 204—181 |
| 3,408,278 | 10/1968 | Stoodley | 204—181 |

RALPH S. KENDALL, Primary Examiner

U.S. Cl. X.R.

29—191, 488; 117—75; 148—31.5; 204—181